United States Patent
Appel et al.

(10) Patent No.: US 10,528,874 B2
(45) Date of Patent: Jan. 7, 2020

(54) SYSTEM, METHOD AND COMPUTER PRODUCT FOR CLASSIFYING USER EXPERTISE

(71) Applicant: International Business Machines Corporation, Armonk, NY (US)

(72) Inventors: Ana Paula Appel, São Paulo (BR); Victor Boa Juliani, São Paulo (BR); Andre Gama Leal, São Paulo (BR); Claudio Santos Pinhanez, São Paulo (BR); Marcela Megumi Terakado, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 608 days.

(21) Appl. No.: 15/241,542

(22) Filed: Aug. 19, 2016

(65) Prior Publication Data

US 2018/0053100 A1    Feb. 22, 2018

(51) Int. Cl.
  *G06N 5/04*    (2006.01)
  *G06N 5/02*    (2006.01)
  *H04L 12/58*    (2006.01)

(52) U.S. Cl.
  CPC ............... *G06N 5/04* (2013.01); *G06N 5/022* (2013.01); *H04L 51/02* (2013.01)

(58) Field of Classification Search
  CPC ............. G06N 5/02; G06N 5/022; G06N 5/04
  See application file for complete search history.

(56) References Cited

U.S. PATENT DOCUMENTS

| | | | | |
|---|---|---|---|---|
| 8,233,613 B1* | 7/2012 | Michaelis | ........... | H04M 1/2474 379/422 |
| 2006/0064504 A1* | 3/2006 | Rechterman | ......... | G06Q 10/107 709/238 |
| 2006/0095575 A1* | 5/2006 | Sureka | ................ | H04L 12/1822 709/227 |
| 2010/0010802 A1* | 1/2010 | Ruano | ................... | G06F 17/277 704/9 |
| 2010/0121672 A1* | 5/2010 | Kohler | ........... | G06Q 10/063116 705/7.25 |
| 2014/0108185 A1* | 4/2014 | Shen | ................... | G06Q 30/0611 705/26.4 |
| 2014/0194186 A1* | 7/2014 | Takahashi | ............... | A63F 13/00 463/23 |
| 2014/0289175 A1* | 9/2014 | Mishra | ..................... | G06N 5/04 706/12 |
| 2014/0295384 A1* | 10/2014 | Nielson | .................. | A61B 5/162 434/157 |

(Continued)

OTHER PUBLICATIONS

Mel, et al. "The NIST Definition of Cloud Computing". Recommendations of the National Institute of Standards and Technology. Nov. 16, 2015.

*Primary Examiner* — Hal Schnee
(74) *Attorney, Agent, or Firm* — Joseph Petrokaitis, Esq.; McGinn IP Law Group, PLLC (57) ABSTRACT

A user expertise classifying method, system, and computer program product, include analyzing an input by a user based on at least one of vocabulary, orthography, and grammar of the user input, processing user background data obtained from a database, and calculating an expertise score of the user based on the analyzed user input and the processed background data.

19 Claims, 4 Drawing Sheets

(56) References Cited

U.S. PATENT DOCUMENTS

| | | | |
|---|---|---|---|
| 2015/0206063 A1* | 7/2015 | Santero | G06N 5/00 |
| | | | 706/12 |
| 2015/0220619 A1* | 8/2015 | Gray | G06F 16/22 |
| | | | 707/738 |
| 2015/0310865 A1* | 10/2015 | Fay | G10L 15/22 |
| | | | 704/254 |
| 2017/0013124 A1* | 1/2017 | Havelka | H04M 3/5166 |

* cited by examiner

SYSTEM, METHOD AND COMPUTER PRODUCT FOR CLASSIFYING USER EXPERTISE

BACKGROUND

The present invention relates generally to a user expertise classifying method, and more particularly, but not by way of limitation, to a system, method, and computer product for classifying a piece of text from the user based on how much the user knows about a subject to set up a conversation about this subject to conduct with the user.

Dialog systems and "chat bots" are increasingly being used and receiving attention from companies like Facebook®, Google®, Apple®, etc. Besides getting answers from those chat bots, users conventionally expect that the chat bots speak in a way, that the users can understand but not underestimate their knowledge.

However, current automated chat systems cannot adapt the user's language and/or adapt the answers to the users' expertise. Also, current chat systems cannot track users' expertise evolution.

However, needs in the art include the needs to dynamically classify user expertise and use this classification to adapt the language and answers of an automated chat system.

SUMMARY

In an exemplary embodiment, the present invention can provide a computer-implemented user expertise classifying method, the method including analyzing an input by a user based on at least one of vocabulary, orthography, and grammar of the user input, processing user background data obtained from a database, and calculating an expertise score of the user based on the analyzed user input and the processed background data.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIG. 1-4, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 1:
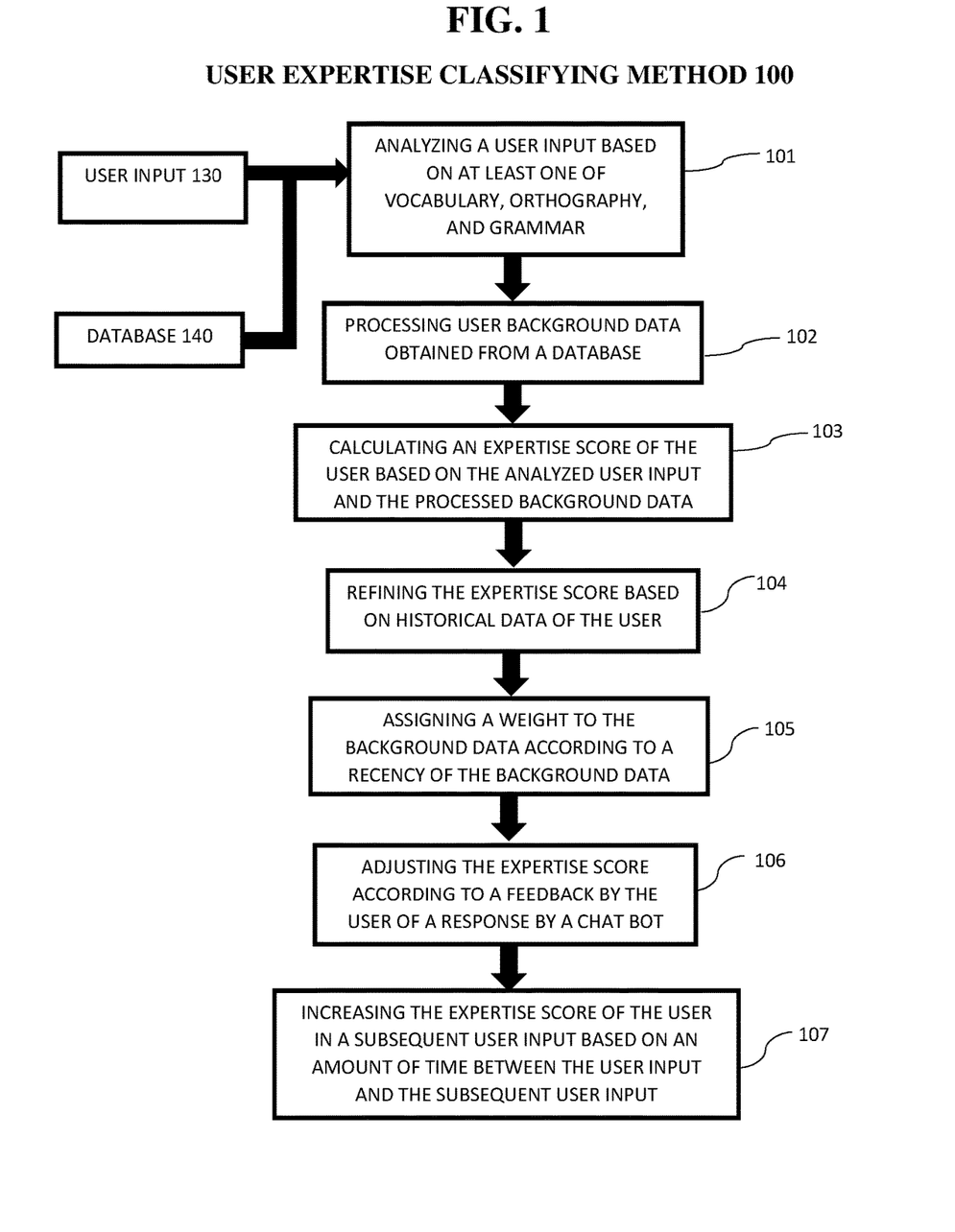
FIG. 1 depicts a flow chart for a user expertise classifying method 100 according to an embodiment of the present invention.

With reference now to the example depicted in FIG. 1, the user expertise classifying method 100 includes various steps to adjust an automatic chat system to users' expertise in a certain domain by analyzing users' interactions with the system and classifying their knowledge. As shown in at least FIG. 2, one or more computers of a computer system 12 according to an embodiment of the present invention can include a memory 28 having instructions stored in a storage system to perform the steps of FIG. 1.

Thus, the user expertise classifying method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 2-4) may be implemented in a cloud environment 50 (see e.g., FIG. 3), it is nonetheless understood that the present invention can be implemented outside of the cloud environment.

In step 101, a user input is analyzed based on at least one of vocabulary, orthography, and grammar of the input. The input by the user comprises any kind of communication accepted by a system, such as, for example, text or voice. The data (converted to text format whenever needed) obtained from the user is then analyzed using Natural Language Processing (NLP) techniques. The vocabulary, orthography and use of grammar of the given text is analyzed to score the user's expertise (as described later) in a domain related to the topic of the question. For example, if the topic of the input is finance, the expertise score is in the domain of finance. Thus, even if the user may be an expert in engineering, the method 100 adapts topically for each domain of the input to determine the user's expertise (e.g., finance in this example) to answer the input.

In some embodiments, it may be expected that users communicating with terms that require a large amount of previous knowledge inside a domain to be fully comprehended should know at least partially this knowledge. Thus, the terms used in a text are related with the topics associated with the words inside a domain to score the probable user's expertise.

In some embodiments, orthography and grammar are weighted less in the score calculation, because it may be difficult to infer knowledge in a domain with only orthography and grammar.

For example, the user input is analyzed for an expertise based on how advanced is the vocabulary used in the question. A user input comprising "is Naproxen a NSAID"

is more advanced than "is a runny nose bad" such that the first input would indicate a greater level of expertise.

In step 102, user background data obtained from a database 140 is processed. That is, in addition to analyzing the user's input to the system, the determination of the expertise score can be more robust and diverse by processing user background data from many different sources to improve the accuracy of the expertise classifications. User background data may include, for example, social media data, a biography of the user indicating experience and work history of the user, wearable data, and educational data. That is, the user background data comprises additional information about a user outside of the domain of the user input to process to provide a more reliable classification of the user's expertise. For example, if the user's educational data indicates the user has a doctorate in advanced biomechanics, this may be weighted greater than the vocabulary of the user input when the domain relates to biomechanics.

In some embodiments, social media data may provide more natural language data to process and create a background of the user to infer the expertise score. Wearables (smartphones, etc.) may provide information about applications and books the user is interested, which may also be related to the user's expertise.

In step 103, an expertise score of the user is calculated based on the analyzed user input and the processed user background data. That is, the expertise score of the user is calculated in real time within a domain of the user input based on the vocabulary, orthography, grammar, and user background data to adapt how the system reacts and answers to the user. The expertise score may comprise a level such as beginner, intermediate, or advanced.

In step 104, the expertise score is refined based on historical data of the user. Historical data may comprise, for example, a shopping history of the user (e.g., books, articles, subscriptions, etc. that the user has purchased), a search history of the user (e.g., articles that the user has read, explanation videos viewed, etc.), a list of presentations by the user, a list of publications by the user, etc. It is noted that a recency of the historical data is weighted to refine the expertise score. For example, a search from ten years ago may not be considered, whereas a search from last week may be weighted more than a search from two weeks ago.

In step 105, a weight is assigned to the user background data according to a recency of the user background data such that the background data reflects a knowledge base of the user. For example, social media posts of ten years ago will be weighed much less than a social media post of a week ago.

In step 106, the expertise score is adjusted according to a feedback of the user for a response by a chat bot. For example, if the answer to the input is too complicated (advanced) for the user, the user can indicate the expertise score may be too high and the expertise score can be adjusted to more accurately reflect the expertise of the user. As such, the user can selectively "dial down" an expertise score assigned to the user.

In some embodiments, after each calculation of the expertise score, the score is used to reset the way the communication system interacts with the user. The system may use the score, for example, to decide how to explain (or display) an answer to the user. In one embodiment, for an expert user (e.g., a high expertise score) the chat bot can use more specialized terms and give a more detailed answer while a simplified and generic answer would be more appropriated for a user with low expertise score. Similarly, a high expertise score could affect the concurrent display of the answer (i.e., audio only) whereas a low expertise score may find benefit by displaying the answer visually or both visually and audio The way the user communicates with the system can also be used to set the level of formality the system uses when responding to the user. This may be achieved using Natural Language Processing techniques. The user is also able to inform the system if he/she feels the explanation is incomplete or too difficult. This feedback is also stored in the user's history and used to recalculate the user's expertise score.

In step 107, the expertise score of the user in a subsequent user input is increased (decreased) based on an amount of time between the input by the user and the subsequent user input. Thereby, the calculating calculates the expertise score in step 103 as a function to add a time factor to the input. In other words, if the user input was within last five minutes about a topic, it is assumed that the user is "more educated" about the topic and the expertise score can be increased. On the other hand, if the user input was six month ago for the topic, it is assumed that the user may be "less educated" about the topic and the expertise score would be calculating as if the user did not have any prior knowledge. The factor may be calculated by, for example, where d is the time factor and t is the time passed since the data was created, in days, weeks or months. The function results in an exponential loss of relevance in the calculation of a user expertise score for a given data as it gets old, at a point that it has no relevance at all. Time is a factor to the calculation because the probability of a user knowing a topic given he or she commented or is interested about it decreases as the time passes. This may happen either because the user is not interested anymore on that topic or because it was forgotten.

In an exemplary embodiment, a first user input can comprise a first question of "what are the symptoms of Zika fever?" The method 100 analyzes the input in step 101, processes the user background data in step 102, and calculates an expertise score in step 103 as a novice user, because the user's vocabulary does not have any too-specific terms that would require a lot of previous knowledge.) The chat bot answers "According to Wikipedia, symptoms include mild headaches, maculopapular rash, fever, malaise, conjunctivitis, and joint pains." A second user input is "what is maculopapular rash?" in which the answer is "A maculopapular rash is a type of rash characterized by a flat, red area on the skin that is covered with small confluent bumps. It may only appear red in lighter-skinned people." And, in the same session of inputs, a third user input is "how do I prevent Zika virus?" in which the answer is "there is no vaccine to prevent or medicine to treat Zika infections."

That is, the expertise score can be re-calculated at each user input or used in consecutive inputs for the same domain.

However, in a second user input two days later, a first user input is "How do I treat Zika?" in which the expertise score previously calculated can be increased based on the recency of the prior user input indicating that the user's expertise is increased for Zika domain. The answer is "According to Centers for Disease Control and Prevention, treat the symptoms: Get plenty of rest, drink fluids to prevent dehydration, take medicine such as acetaminophen (Tylenol®) or paracetamol to relieve fever and pain, do not take aspirin and other non-steroidal anti-inflammatory drugs. If you are taking medicine for another medical condition, talk to your healthcare provider before taking additional medication." In the second user input session, the expertise score was increased based on the recency of the user input such that the second answer included more technical terms.

In another exemplary embodiment, the user input is in the Health domain and the user background knowledge indicates that the user has health knowledge (e.g., the user has published papers related to medicine). The user input is "Is Naproxen a NSAID?" in which the input is analyzed such that the given text has vocabulary terms that require a lot of previous knowledge. The user background data is processed and an expertise score is calculated which indicates that the user is an expert user. Then, the system answers according to this user's score. The answers is "yes, according to Wikipedia, Naproxen (brand names: Aleve, Naprosyn, and many others) is a nonsteroidal anti-inflammatory drug (NSAID) of the propionic acid class (the same class as ibuprofen) that relieves pain, fever, swelling, and stiffness. It is a nonselective COX inhibitor, usually sold as the sodium salt." The user responds with feedback that the user does not understand what a COX inhibitor is (e.g., in step 106). For this example, a high expertise score for this user was calculated. For example, if the score range is [0,1], the score for this user could be 1. Thereby, the response used technical terms to answer the user's questions appropriate to the user's knowledge and expertise level in the health domain. However, the user did not know a term (COX inhibitor) that was expected that the user may know. Thus, the expertise score was adjusted (e.g., decreased) according to this new information (e.g., feedback) and the score was set to 0.9.

In some embodiments, the expertise score can be recalculated with each user input based on the user input comprising new vocabulary, orthography, and grammar indicating that the user has a greater expertise than the initially calculated score.

In some embodiments, a machine or network configuration may be utilized with the analyzing an input by a user based on at least one of vocabulary, orthography, and grammar of the user input and the processing user background data obtained from a database such that a Graphical User Interface (GUI) can display as a pop-up the calculated expertise score of the user based on the analyzed user input and the processed background in which the user can adjust the score accordingly using the GUI. That is, the graphical user interface may display the score with "up" and "down" arrows to adjust the expertise score to be higher (more expertise) or lower (less expertise) in order to allow the user to provide the feedback.

Exemplary Aspects, Using a Cloud-Computing Environment

Although this detailed description includes an exemplary embodiment of the present invention in a cloud-computing environment, it is to be understood that implementation of the teachings recited herein are not limited to such a cloud-computing environment. Rather, embodiments of the present invention are capable of being implemented in conjunction with any other type of computing environment now known or later developed.

Cloud-computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud-computing is an infrastructure comprising a network of interconnected nodes.

Figure 2:
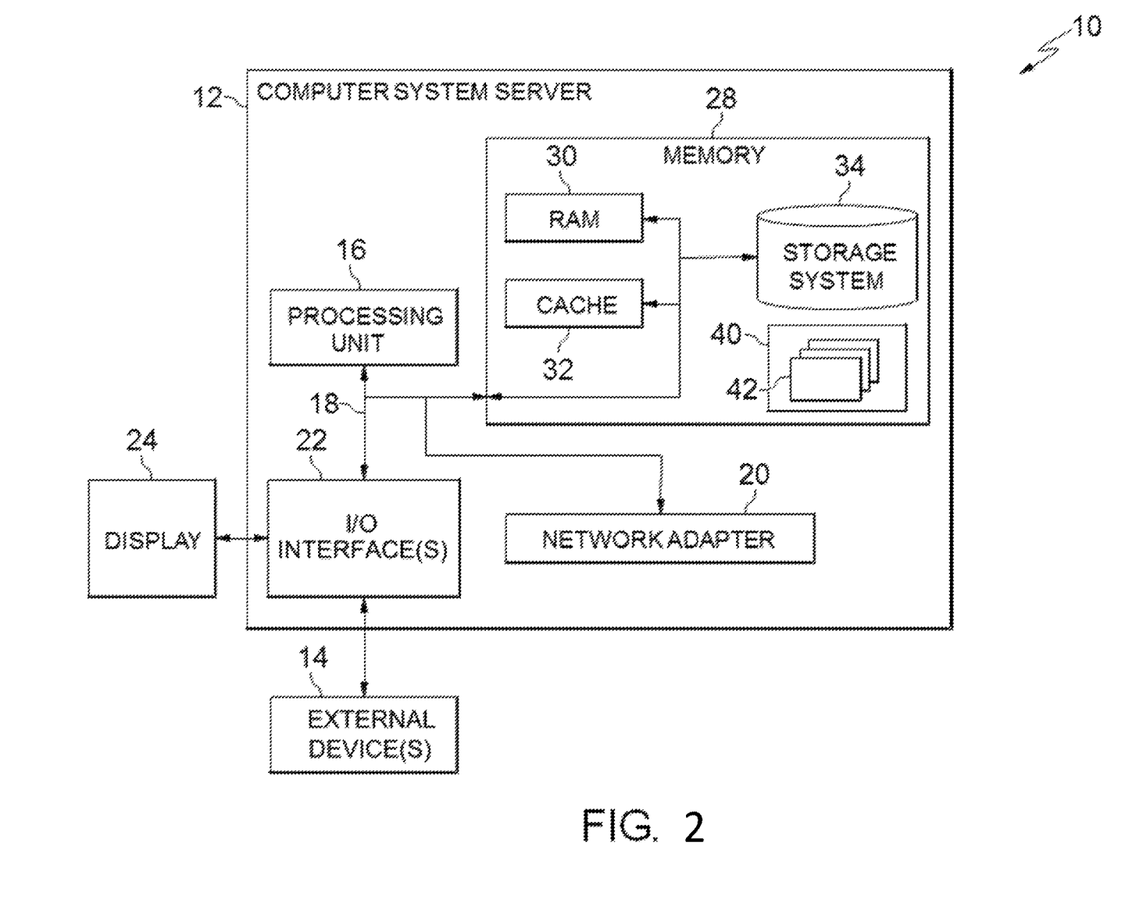
FIG. 2 depicts a cloud computing node 10 according to an embodiment of the present invention.

Referring now to FIG. 2, a schematic of an example of a cloud-computing node is shown. Cloud-computing node 10 is only one example of a suitable node and is not intended to suggest any limitation as to the scope of use or functionality of embodiments of the invention described herein. Regardless, cloud-computing node 10 is capable of being implemented and/or performing any of the functionality set forth herein.

Although cloud-computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud-computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud-computing environments where tasks are performed by remote processing circuits that are linked through a communications network. In a distributed cloud-computing environment, program modules may be located in both local and remote computer system storage media including memory storage circuits.

Referring again to FIG. 2, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 3:
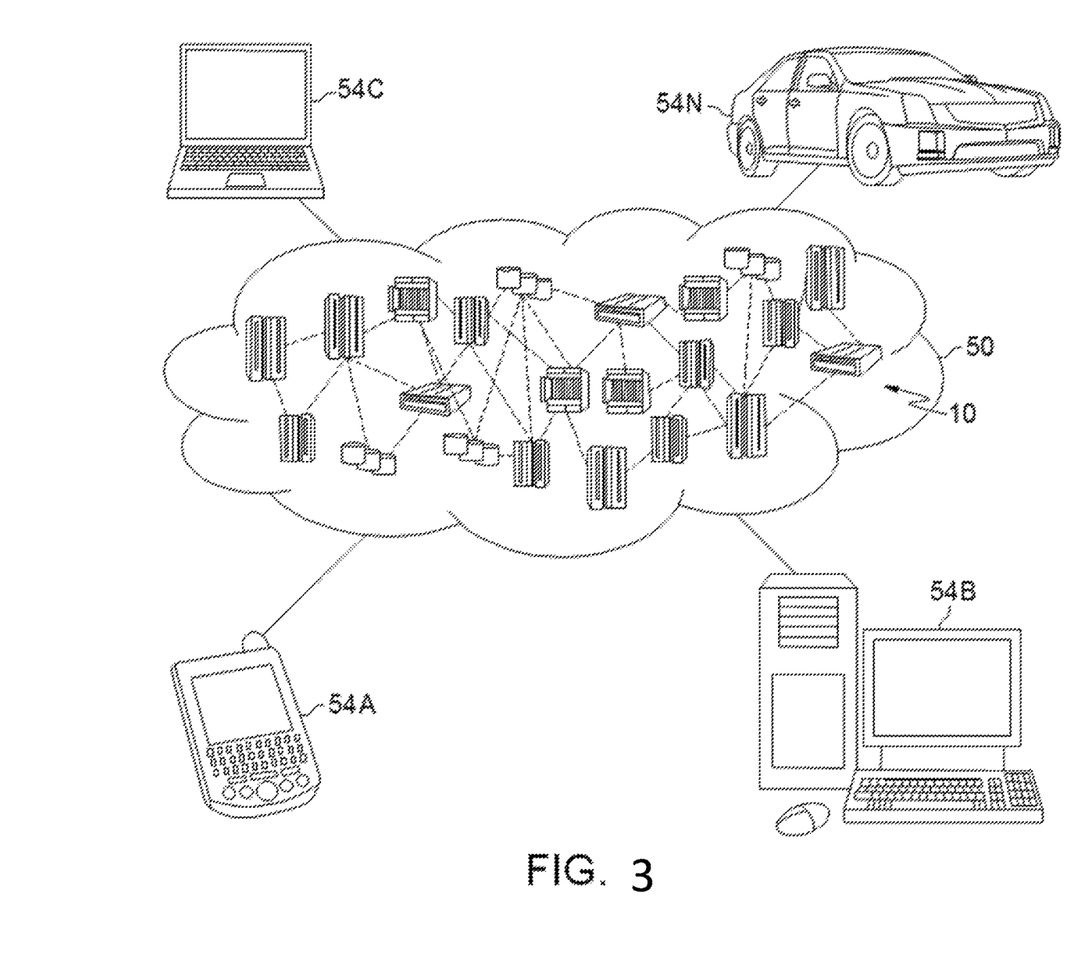
FIG. 3 depicts a cloud computing environment 50 according to an embodiment of the present invention.

Referring now to FIG. 3, illustrative cloud-computing environment 50 is depicted. As shown, cloud-computing environment 50 comprises one or more cloud-computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud-computing environment 50 can communicate with any type of computerized circuit over any type of network and/or network addressable connection (e.g., using a web browser).

Figure 4:
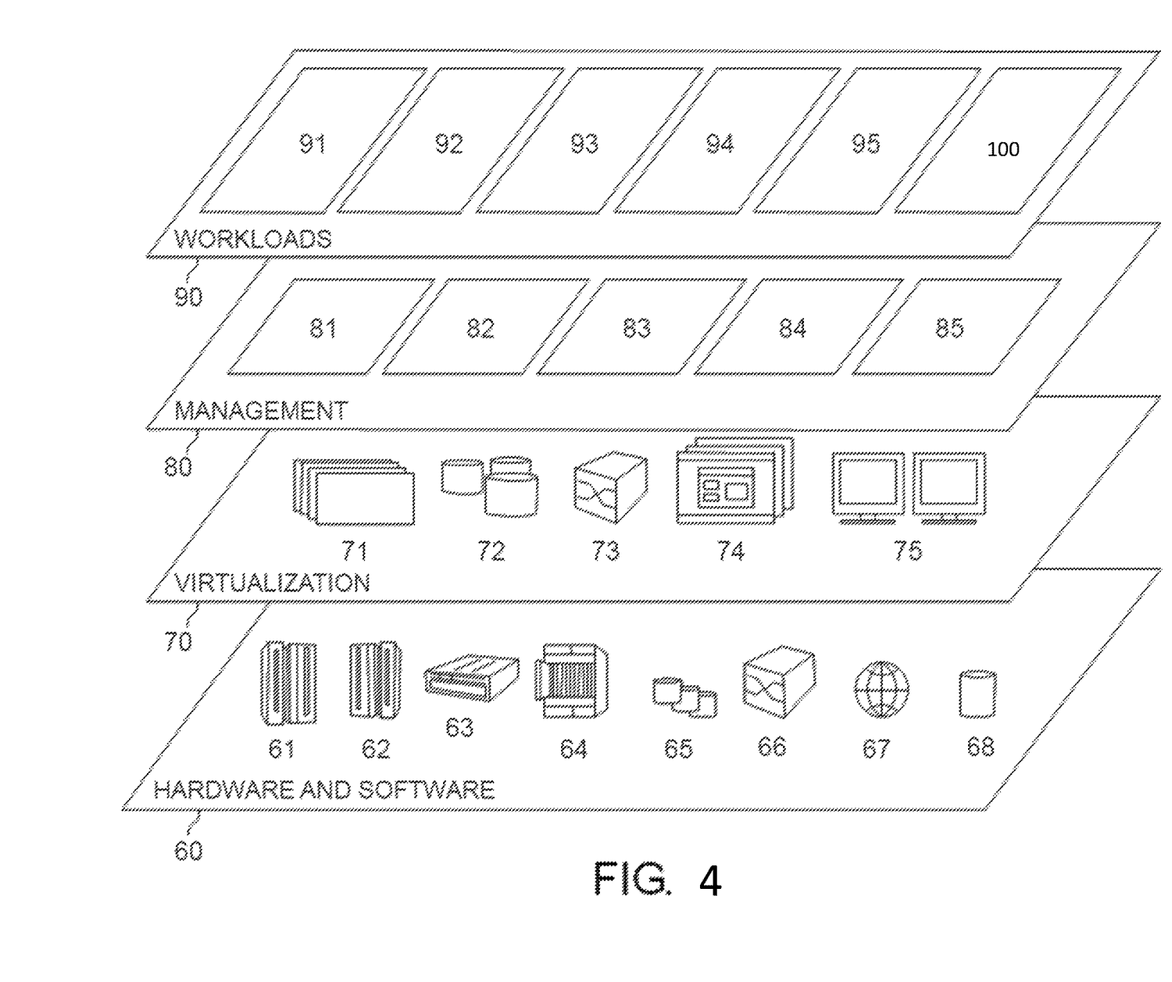
FIG. 4 depicts abstraction model layers according to an embodiment of the present invention.

Referring now to FIG. 4, an exemplary set of functional abstraction layers provided by cloud-computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud-computing resource allocation and management such that required service levels are met. Service Level Agreement (SLA) planning and fulfillment 85 provide pre-arrangement for, and procurement of, cloud-computing resources for which a future requirement is anticipated in accordance with an SLA.

Workloads layer 90 provides examples of functionality for which the cloud-computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the user expertise classifying method 100.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented user expertise classifying method, the method comprising:
    analyzing an input by a user based on at least one of vocabulary, orthography, and grammar of the user input;
    processing user background data relating to a specific topical domain obtained from a database;
    calculating an expertise score of the user for the specific topical domain based on the analyzed user input and the processed background data; and
    adjusting a chat bot for the specific topical domain to interact with the user based on the expertise score,
    wherein the calculating repeats the calculating for a second expertise score for a second specific topical domain when the chat bot is for the second specific topical domain, and
    wherein the chat bot produces a combination of a display response and audio response based on the expertise score,
    further comprising increasing the expertise score of the user in a subsequent user input if an amount of time between the user input and the subsequent user input is less than a predetermined threshold time,
    wherein the chat bot comprises a conversational artificial intelligence agent.

2. The computer-implemented method of claim 1, wherein the expertise score indicates a knowledge level of the user in the specific topical domain of the input.

3. The computer-implemented method of claim 1, wherein the expertise score comprises a plurality of predetermined levels of expertise, and
    wherein the calculating determines a level of the predetermined levels of expertise in which the user can understand an answer to the input according to the expertise score of the user being higher than a base amount for the level of the predetermined levels.

4. The computer-implemented method of claim 1, wherein the input by the user comprises a query to a question-and-answer system.

5. The computer-implemented method of claim 1, wherein the background data is selected from a group consisting of:
    social media data;
    a biography of the user;
    wearable data; and
    educational data.

6. The computer-implemented method of claim 1, further comprising refining the expertise score based on historical data about the user, the historical data being selected from a group consisting of:
    a shopping history of the user;
    a search history of the user;
    a list of presentations by the user; and
    a list of publications by the user.

7. The computer-implemented method of claim 1, further comprising assigning a weight to each item of the background data based on a recency of the item of the background data.

8. The computer-implemented method of claim 1, further comprising adjusting the expertise score according to a feedback by the user indicating an understanding of a response by the chat bot based on the expertise score.

9. The computer-implemented method of claim 1, embodied in a cloud-computing environment.

10. A computer program product for user expertise classifying, the computer program product comprising a computer-readable storage medium having program instructions embodied therewith, the program instructions executable by a computer to cause the computer to perform:
analyzing an input by a user based on at least one of vocabulary, orthography, and grammar of the user input;
processing user background data relating to a specific topical domain obtained from a database;
calculating an expertise score of the user for the specific topical domain based on the analyzed user input and the processed background data; and
adjusting a chat hot for the specific topical domain to interact with the user based on the expertise score,
wherein the calculating repeats the calculating for a second expertise score for a second specific topical domain when the chat hot is for the second specific topical domain, and
wherein the chat bot produces a combination of a display response and audio response based on the expertise score,
further comprising increasing the expertise score of the user in a subsequent user input if an amount of time between the user input and the subsequent user input is less than a predetermined threshold time,
wherein the chat bot comprises a conversational intelligence agent.

11. The computer program product of claim 10, wherein the expertise score indicates a knowledge level of the user in the specific topical domain of the input.

12. The computer program product of claim 10, wherein the expertise score comprises a plurality of predetermined levels of expertise, and
wherein the calculating determines a level of the predetermined levels of expertise in which the user can understand an answer to the input according to the expertise score of the user being higher than a base amount for the level of the predetermined levels.

13. The computer program product of claim 10, wherein the input by the user comprises a query to a question-and-answer system.

14. The computer program product of claim 10, wherein the background data is selected from a group consisting of:
social media data;
a biography of the user;
wearable data; and
educational data.

15. The computer program product of claim 10, further comprising refining the expertise score based on historical data about the user, the historical data being selected from a group consisting of:
a shopping history of the user;
a search history of the user;
a list of presentations by the user; and
a list of publications by the user.

16. The computer program product of claim 10, further comprising assigning a weight to each item of the background data based on a recency of the item of the background data.

17. The computer program product of claim 10, further comprising adjusting the expertise score according to a feedback by the user indicating an understanding of a response by the chat bot based on the expertise score.

18. A user expertise classifying system, said system comprising:
a processor; and
a memory, the memory storing instructions to cause the processor to:
analyze an input by a user based on at least one of vocabulary; orthography, and grammar of the user input;
process user background data relating to a specific topical domain obtained from a database;
calculate an expertise score of the user for the specific topical domain based on the analyzed user input and the processed background data; and
adjust a chat bot for the specific topical domain to interact with the user based on the expertise score,
wherein the calculating repeats the calculating for a second expertise score for a second specific topical domain when the chat bot is for the second specific topical domain, and
wherein the chat bot produces a combination of a display response and audio response based on the expertise score,
further comprising increasing the expertise score of the user in a subsequent user input if an amount of time between the user input and the subsequent user input is less than a predetermined threshold time,
wherein the chat bot comprises a conversational artificial intelligence agent.

19. The system of claim 18, embodied in a cloud-computing environment.

* * * * *